United States Patent
Zhu et al.

(10) Patent No.: US 10,520,647 B2
(45) Date of Patent: Dec. 31, 2019

(54) ANTI-FOG AND ANTI-REFLECTIVE DUAL-FUNCTIONAL COATING FOR OPTICAL ARTICLES

(71) Applicant: Honeywell International Inc., Morristown, NJ (US)

(72) Inventors: Shaopeng Zhu, Shanghai (CN); Jon Nebo, Waltham, MA (US); Philip M. Johnson, Charlton, MA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/678,161

(22) Filed: Aug. 16, 2017

(65) Prior Publication Data

US 2019/0056529 A1 Feb. 21, 2019

(51) Int. Cl.
| | |
|---|---|
| G02B 7/18 | (2006.01) |
| G02B 1/11 | (2015.01) |
| G02B 1/18 | (2015.01) |
| G02B 5/20 | (2006.01) |

(52) U.S. Cl.
CPC .............. *G02B 1/11* (2013.01); *G02B 1/18* (2015.01); *G02B 5/206* (2013.01); *G02B 2207/101* (2013.01); *G02B 2207/107* (2013.01)

(58) Field of Classification Search
CPC ...... G02B 1/11; G02B 1/18; G02B 2207/101; G02B 2207/107

USPC ............................................. 359/513
See application file for complete search history.

(56) References Cited

U.S. PATENT DOCUMENTS

| | | | |
|---|---|---|---|
| 5,585,186 A | 12/1996 | Scholz et al. | |
| 5,733,659 A * | 3/1998 | Iwakiri | B29C 45/0005 428/412 |
| 9,034,489 B2 | 5/2015 | Jing et al. | |
| 2006/0046046 A1* | 3/2006 | Wang | G02B 1/105 428/315.7 |
| 2006/0154044 A1 | 7/2006 | Yamada et al. | |
| 2011/0318567 A1 | 12/2011 | Hildenbrand et al. | |
| 2016/0332415 A1* | 11/2016 | Lyons | B32B 7/06 |

FOREIGN PATENT DOCUMENTS

| | | |
|---|---|---|
| EP | 0871046 A1 | 10/1998 |
| EP | 1591804 A1 | 11/2005 |

OTHER PUBLICATIONS

Extended European Search Report for Application No. 18188699.5, dated Jan. 9, 2019, 6 pages.

* cited by examiner

*Primary Examiner* — Euncha P Cherry
(74) *Attorney, Agent, or Firm* — Alston & Bird LLP

(57) ABSTRACT

A coating for an optical article, such as a lens, includes a bottom coating having at least one hydrophilic resin binder and at least one surfactant, forming an anti-fogging layer, and a top coating overlying the bottom coating, forming an anti-reflective layer. The top coating includes nanopores, which may be less than 150 nm in size.

19 Claims, 3 Drawing Sheets

| Key parameters | PVD AR (state of the art) | Average AF (state of the art) | Best AF in market | Preferred Embodiments |
|---|---|---|---|---|
| Coating layers | >5 AR + 1 HC | 1 AF | 1 AF | 1 AF + 1 AR |
| Resistance to Fogging (EN166-168, or ASTM F659) | <2s | 5~12 s | >120s | >120s |
| Visible Light transmittance (380-780 nm) | 95.4-96.6% | 85-90% | 85-90% | 98.7% |
| Visible light reflectance (380-780 nm) | 2-3% | 5-8% | 5-8% | ~1% |
| Bayer ratio for abrasion resistance (ASTM F735) | 2-6 | <=0.5 | >1 | >1.2 |

Fig. 4

ANTI-FOG AND ANTI-REFLECTIVE DUAL-FUNCTIONAL COATING FOR OPTICAL ARTICLES

BACKGROUND OF THE INVENTION

1. Field of the Invention

The present patent document relates generally to articles having optical lenses, such as safety eyewear, and more particularly to an anti-fog and anti-reflective dual-functional coating for optical articles.

2. Background of the Related Art

Optical articles having anti-reflective ("AR") and anti-fogging ("AF") functionality are desirable. However, a dilemma arises due to the conflict between the capabilities of prior art coating technologies and user expectations. No dual-functional AF and AR optical articles exist, either as prescription ("Rx") or safety eyewear. Rx users desire AF properties especially in winter, but not at the expense of giving up AR which is crucial for their eyes' health and reasonably clear vision, whereas safety eyewear users need AR coating for protection of their vision and safety, but they are reluctant to give up the AF properties desired in many common work scenarios. Reduced scratch and abrasion resistance and durability of most AF coatings compared to high performance hard coats is also a barrier to the use of Anti-fog coatings in the ophthalmic market.

Accordingly, the science and engineering community having struggled with producing optical articles with both AR and (long-lasting) AF coatings. In fact, the industry intrinsically believes that these two features cannot coexist. Principally, an AR coating should be the outmost layer because of the law in optics which allows only a low-index layer on top of all coatings to inferentially reduce reflection. On the other hand, AF coating should also be the outmost layer since the hydrophilic interface must be directly exposed to the moist air to let the condensed moisture form a flat-water layer so as to prevent droplet formation, i.e. fog. Currently no material has been found with both super-hydrophilic and low-index properties, and even if so, to be reasonably anti-fog, a coating must be thick enough at least in the micrometers, but an AR coating (for visible light) must be generally hundreds of nanometers thick altogether.

Therefore, there is a need in the industry for a coating for an optical article that is both long-lasting anti-fog and anti-reflective.

SUMMARY OF THE INVENTION

The coating for an optical article disclosed herein solves the problems of the prior art by providing a coating and method of applying the coating to and optical article that provides a feasible, simple, scalable and cost-efficient way of combining AF and AR properties in one coating combination. Furthermore, this coating composition and method does not require partial compromise of AF or AR performance for a combination, but can achieve high-level AF and AR performances at the same time, compared to state-of-the-art AF only and AR only counterparts in the market.

The coating for and the method of coating an optical article, such as a lens, includes a bottom coating having at least one hydrophilic resin binder, forming an anti-fogging layer, and a top coating overlying the bottom coating, forming an anti-reflective layer. The top coating includes nanopores, which may be less than 150 nm in size, allowing moisture to penetrate the top coating and condense as a flat layer of water on the surface of the hydrophilic anti-fogging bottom coating.

BRIEF DESCRIPTION OF THE DRAWINGS

These and other features, aspects, and advantages of the present invention will become better understood with reference to the following description, appended claims, and accompanying drawings where:

FIG. 4 is a flow chart of forming an optical article with an anti-reflective and anti-fogging coatings as described herein.

DESCRIPTION OF THE PREFERRED EMBODIMENT

Figure 2:
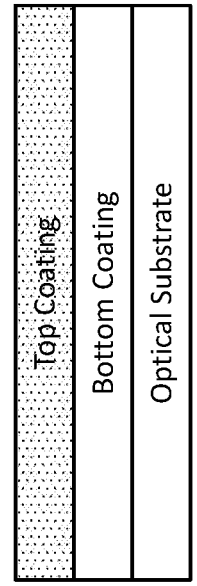
FIG. 2 is a diagram of an alternative embodiment of an optical article having the anti-reflective and anti-fogging coatings as described herein.
Figure 1:
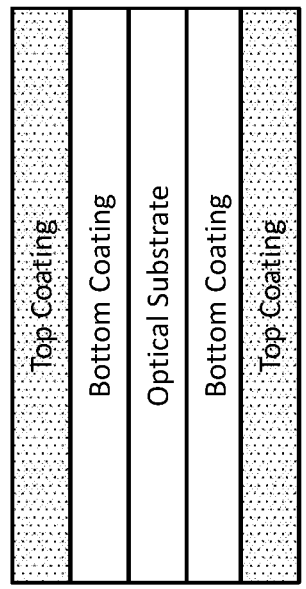
FIG. 1 is a diagram of an optical article having the anti-reflective and anti-fogging coatings as described herein.
Figure 3:
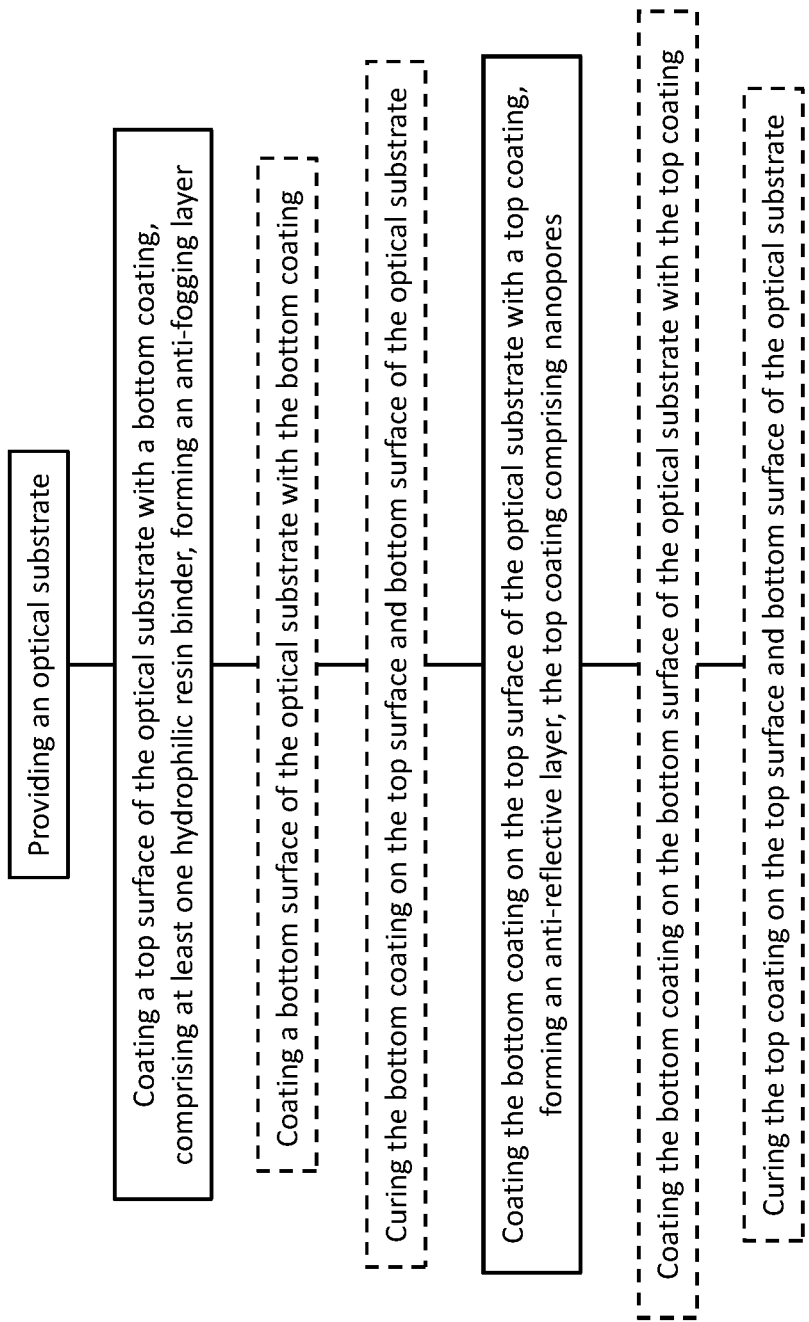
FIG. 3 is a table illustrating comparing properties of the coating for an optical article disclosed herein and prior art coatings.

Referring to FIGS. 1-3, a coating for and a method of coating an optical article, such as a lens, is shown generally overlying an optical substrate. The coating includes a bottom coating having at least one hydrophilic resin binder and at least one surfactant, forming an anti-fogging layer, and a top coating overlying the bottom coating, forming an anti-reflective layer. The top coating includes nanopores, which may be less than 150 nm in size, allowing moisture to penetrate the top coating and be repelled by the hydrophilic anti-fogging bottom coating. As shown in FIG. 1 the coating may be applied to a top surface and a bottom surface of the optical substrate. In FIG. 2, the coating may be applied to a single surface, such as the top surface, of the optical substrate.

Although the examples described herein for the optical substrate and/or optical article include lenses for safety and prescription eyewear, it is to be understood that the coatings described herein may be applied to other optical articles and/or optical substrates where anti-fogging and anti-reflective properties are desired.

The bottom coating is a transparent hydrophilic coating comprising at least one hydrophilic resin as the binder. The resin may be cross-linked. The bottom coating may further include at least one kind of surfactant, which may or may not be bonded onto the resin binder. The binder of the bottom coating may be, but is not limited to, polyurethane, acrylic, polysiloxane, epoxy, polyvinyl alcohol, polyvinylpyrrolidone, polyethylene glycol, and combinations or hybrids thereof. The surfactant, if included, may be cationic, anionic or non-ionic, and formulated to give hydrophilicity with water contact angle <40 degrees, or, further, <20 degrees. This bottom coating forms an anti-fogging layer. The thickness range of the bottom coating may be from about 2 microns to about 25 microns. The bottom coating may be formed through dip-coating or flow-coating onto the optical article and/or optical substrate. The bottom coating may be cured through a thermal or UV curing process if it needs to be cross-linked or where needed.

The top coating is a nanoporous coating with the porosity ranging from 30% to 90%, and pore size <150 nm. The nanopores are considerably smaller than the wavelengths of visible light, so that light scattering is minimized, and ensuring the top coating is transparent and not hazy. The thickness of the top coating may be in the range 70-200 nm. The most preferable thickness is selected by a quarter of wavelength of incident light that needs to be canceled. The main component of the top coating is a transparent, dielectric and non-water-soluble oxide, fluoride, nitride or sulfide, e.g. SiOx, AlOx, MgOx, ZrOx, TiOx, HfOx, ZnOx, MgFx, CaFx, SiNx, ZnSx, etc. The suffix "x" means they might be off-stoichiometry. The refractive index of the top coating is typically in the range of 1.15~1.45, and it depends on 1) the bulk refractive index of the coating material and 2) the porosity of the material. The most preferable refractive index of the top coating is calculated as the square root of the effective refractive index of the substrate, and can theoretically be achieved by selecting the material and synthetically varying the porosity.

The porosity of the top coating not only lowers its refractive index, making it a good anti-reflective coating, but also enables water vapor to be absorbed and to penetrate the top coating, facilitating the contact of condensed water with the hydrophilic groups on bottom coating. Thus, a uniform water film instead of droplets form on the surface of the top coating, so that the bottom coating's anti-fog performance is retained. This is the key to combine anti-fog and anti-reflective properties in one coating combination.

To form the porous top coating, a bottom-up synthesis method such as sol-gel dip-coating, chemical bath deposition, oblique angle evaporation, layer-by-layer assembly, soft-templated solvent deposition, etc. may be used. The recommended method is dip-coating from nanoparticle dispersions of the top coating material. A typical dispersion consists of at least one solvent, at least one kind of nanoparticles of diameter ranging from 1 to 150 nm dispersed in the solvent, usually with the assistance of organic stabilizers, and in some scenario a cross-linker that combines with surface groups of nanoparticles may also be added. A certain solid content of the dispersion is chosen to give the best thickness of the top coating.

EXAMPLE 1

A commercial polyurethane-based anti-fog coating formulation with the brand name of Visgard Premium Plus from FSI Coating Technologies Corp. is chosen as the bottom coat. PC lens is dip-coated by this formulation and thermally cured at 120 degrees C. for 1 h to give a cross-linked, 8 micron-thick anti-fog coating. This coating has fog-free time surpassing 120 s as routinely tested by methods described in EN168. Then the coated PC lens is dip-coated in a mixed suspension of silica nanoparticles of diameters ~50 nm and ~12 nm, with the ratio of these two sizes 1.8:1. The dispersant is composed of propylene glycol methyl ether diluted IPA dispersed silica nanoparticles, with ~0.3% of IPA and the solid content being ~0.7%. The coated lens is heat-treated in 120 degrees C. for 1 h again to get a cross-linked porous top layer. The fog-free time remains >120 s after top coating is deposited and the light transmittance of coated PC lens is ~96%, which is effective to eliminate the majority of double images stemming from lens reflection.

EXAMPLE 2

A commercial waterborne anti-fog coating formulation with brand name of G*NK from Gelwell Biotech Corp. is chosen as the bottom coat, with fog-free time >120 s after dip-coated and thermally cured for 1 h in 125 degrees C. A 1:2 mixture of 1) Silica nanoparticle suspension with brand name of NanoBYK-3652 from BYK Additives & Instruments GmbH diluted 19 fold by propylene glycol methyl ether, and 2) Silica nanoparticle suspension with brand name of HB-PS020-IPA from Hu Ben New Material Technology (Shanghai) Co., Ltd. Diluted 27 fold by propylene glycol methyl ether, is then dip-coated onto the anti-fog coated lens as the top coating and thermally treated in 120 degrees C. for 1 h. The fog-free time remains >120 s after top coating is deposited and the light transmittance of coated PC lens can reach ~97%.

Referring to FIG. 3, the typical performances of homemade dual-functional coating on polycarbonate lenses, compared with commercial state-of-the-art anti-reflective coatings and anti-fog coatings on safety eyewear, is illustrated in a table. As summarized in the table, the dual-functional coating sample of the preferred embodiments approaches the best anti-fog performance in the market, and exceeds the best anti-reflective coated safety eyewear in light transmittance.

Therefore, it can be seen that the present invention provides a unique solution to the problem of providing an optical article, such as a lens in eyewear, a coating that both provides anti-reflective and anti-fogging properties that are long lasting and durable.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:
1. A coating for an optical article, comprising:
   a bottom coating comprising at least one hydrophilic resin binder, forming an anti-fogging layer; and
   a top coating overlying the bottom coating, forming an anti-reflective layer, the top coating comprising nanopores and nanoparticles.
2. The coating of claim 1, wherein the nanopores have less than 150 nm pore size.
3. The coating of claim 1, wherein the top coating further comprises a porosity from about 30% to about 90%.
4. The coating of claim 1, wherein the nanoparticles have a diameter ranging in size from about 1 to about 150 nm dispersed in a solvent.
5. The coating of claim 1, wherein the top coating further comprises a transparent, dielectric and non-water-soluble compound selected from the group consisting essentially of oxides, nitrides and sulfides.
6. The coating of claim 1, wherein the binder is selected from the group consisting essentially of: polyurethane, acrylic, polysiloxane, epoxy, polyvinyl alcohol, polyvinylpyrrolidone, polyethylene glycol, and combinations and hybrids thereof.
7. The coating of claim 1, wherein the thickness of the top coating is from about 70 to about 200 nm.
8. The coating of claim 1, wherein the thickness of the bottom coating is from about 2 to about 25 microns.
9. A method of making an optical article, comprising:
   providing an optical substrate having a top surface and a bottom surface;
   coating the top surface of the optical substrate with a bottom coating comprising at least one hydrophilic resin binder, forming an anti-fogging layer;

coating the bottom coating on the top surface of the optical substrate with a top coating, forming an anti-reflective layer, the top coating comprising nanopores and nanoparticles.

10. The method of claim 9 wherein the nanopores have less than 150 nm pore size.

11. The method of claim 9, wherein the top coating further comprises a porosity from about 30% to about 90%.

12. The method of claim 9, wherein the nanoparticles have a diameter ranging in size from about 1 to about 150 nm dispersed in a solvent.

13. The method of claim 9, wherein the top coating is coated on the optical substrate by a method selected from the group consisting essentially of sol-gel dip-coating, chemical bath deposition, oblique angle evaporation, layer-by-layer assembly, and soft-templated solvent deposition.

14. The method of claim 9, further comprising:
coating the bottom surface of the optical substrate with the bottom coating; and
coating the bottom coating on the bottom surface of the optical substrate with the top coating.

15. The method of claim 9, further comprising curing the bottom coating.

16. The method of claim 9, further comprising curing the top coating.

17. The method of claim 9, wherein the top coating further comprises a transparent, dielectric and non-water-soluble compound selected from the group consisting essentially of oxides, nitrides and sulfides.

18. An optical article, comprising:
an optical substrate having a top surface and a bottom surface;
a bottom coating overlying the top surface and bottom surface of the optical substrate, comprising at least one hydrophilic resin binder, forming an anti-fogging layer; and
a top coating overlying the bottom coating, forming an anti-reflective layer, the top coating comprising nanopores and nanoparticles.

19. The coating of claim 18, wherein the nanopores have less than 150 nm pore size.

* * * * *